United States Patent
Brabec (10) Patent No.: US 8,560,157 B2
(45) Date of Patent: Oct. 15, 2013

(54) PARTIAL MANUAL CONTROL STATE FOR AUTOMATED VEHICLE NAVIGATION SYSTEM

(75) Inventor: Vernon Joseph Brabec, Livermore, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 761 days.

(21) Appl. No.: 11/901,933

(22) Filed: Sep. 19, 2007

(65) Prior Publication Data

US 2009/0076673 A1  Mar. 19, 2009

(51) Int. Cl.
*G01C 22/02* (2006.01)
*G05D 1/00* (2006.01)

(52) U.S. Cl.
USPC ........... 701/23; 701/117; 701/29.1; 701/29.2; 701/32.3; 701/32.4; 701/408; 701/468; 701/300; 701/302; 180/167; 180/168; 180/271; 342/357.21; 340/438; 340/465

(58) Field of Classification Search
USPC ........... 701/23, 1, 24, 36, 41, 45, 50, 93, 116, 701/117, 29.1, 29.2, 29.7, 32.3, 32.4, 400, 701/408, 468, 472, 494, 500, 501, 502, 508, 701/515, 300, 301, 302; 180/167–169, 197, 180/271, 272, 274, 280, 282; 342/357.21, 342/357.22, 357.23, 357.39; 340/933, 935, 340/988, 435, 436, 437, 438, 439, 440, 465, 340/466

See application file for complete search history.

(56) References Cited

U.S. PATENT DOCUMENTS

| | | | | |
|---|---|---|---|---|
| 5,572,449 A * | 11/1996 | Tang et al. | ...................... | 700/304 |
| 5,684,696 A * | 11/1997 | Rao et al. | .......................... | 701/25 |
| 5,838,562 A | 11/1998 | Gudat et al. | | |
| 5,956,250 A | 9/1999 | Gudat et al. | | |
| 5,974,348 A * | 10/1999 | Rocks | .............................. | 701/28 |
| 6,067,782 A | 5/2000 | Diekhans | | |
| 6,198,992 B1 | 3/2001 | Winslow | | |
| 6,263,270 B1 * | 7/2001 | Sato et al. | ........................ | 701/41 |
| 6,542,077 B2 | 4/2003 | Joao | | |
| 6,647,328 B2 | 11/2003 | Walker | | |
| 6,732,024 B2 | 5/2004 | Wilhelm Rekow et al. | | |

(Continued)

FOREIGN PATENT DOCUMENTS

| | | |
|---|---|---|
| EP | 1504981 A | 2/2005 |
| JP | 2003182617 | 7/2003 |
| JP | 2003202926 | 7/2003 |
| JP | 2003312410 A * | 11/2003 |

OTHER PUBLICATIONS

JP 2003-312410 English Translation.*

(Continued)

*Primary Examiner* — Thomas H. Tarcza
*Assistant Examiner* — Rami Khatib
(74) *Attorney, Agent, or Firm* — Wolff & Samson, PC (57) ABSTRACT

Disclosed are methods and apparatuses for automated control of a moving vehicle. An alarm condition is detected, and in response to the alarm condition, the current radius of curvature of the vehicle is maintained. The radius of curvature may be calculated by using data received from sensors. The alarm condition may be a result of the vehicle becoming unstable or the automated navigation system malfunctioning. In response to operator control input, the vehicle is placed into a manual control state.

17 Claims, 4 Drawing Sheets

(56) References Cited

U.S. PATENT DOCUMENTS

| | | |
|---|---|---|
| 6,751,535 B2 | 6/2004 | Mori |
| 6,868,324 B2 | 3/2005 | Matsumoto et al. |
| 6,882,917 B2 | 4/2005 | Pillar et al. |
| 6,975,246 B1 * | 12/2005 | Trudeau .................. 340/903 |
| 7,085,637 B2 * | 8/2006 | Breed et al. ............... 701/38 |
| 7,103,461 B2 * | 9/2006 | Iwazaki et al. ............ 701/41 |
| 7,509,199 B2 * | 3/2009 | Rekow ...................... 701/50 |
| 2005/0205311 A1 * | 9/2005 | Yanaka et al. ............ 180/6.32 |

OTHER PUBLICATIONS

International Search Report and Written Opinion of the International Searching Authority for corresponding PCT application PCT/US2008/010523 mailed Mar. 24, 2009.

* cited by examiner

PARTIAL MANUAL CONTROL STATE FOR AUTOMATED VEHICLE NAVIGATION SYSTEM

FIELD OF THE INVENTION

The present invention relates generally to vehicle automated navigation systems and more specifically to partial manual control state for an automated vehicle navigation system.

BACKGROUND OF THE INVENTION

Automated control of a vehicle is well known and useful in a variety of applications. In the field of farming, tractors are often configured to travel on preset paths in order to efficiently cover an area. In the field of construction and road work, equipment is often controlled by an autonomous system to ensure the accuracy of vehicle paths, such as that of pavers and bulldozers. More recently, autonomous driving systems have been developed for passenger and freight vehicles on roadways.

Automated vehicles are controlled by a variety of means. Many are controlled with the aid of navigational satellite systems such as GPS. Such vehicles carry a GPS receiver to calculate the position of the vehicle by measuring the distance between itself and at least three GPS satellites. The position of the vehicle is determined by measuring the time delay between transmission and reception of a signal from each GPS satellite and triangulating the position of the vehicle based on this data. Other systems known in the art function by traveling over a preset path, garnering path data while doing so, and providing the data to a system for controlling a vehicle so that the vehicle can use the data to determine a path of travel. Similarly, map data may be provided to aid in controlling a vehicle.

Another method of automated control of a vehicle is dead reckoning navigation. In this method, vehicle position data is determined by calculating traveling distance as a function of the speed of the vehicle and an azimuth of the vehicle is estimated by using a gyroscope and an earth magnetism sensor, thereby estimating the position of the vehicle. This is often combined with an inertial navigation system whereby the position and the azimuth of the vehicle are estimated by using a gyroscope and measuring acceleration.

These and other such systems have the advantage of increased precision and decreased effort upon the part of a user, but such systems also come with drawbacks. Automated systems are known to malfunction and in a moving vehicle safety is essential. If a vehicle controlled by an automated system leaves the desired path, fertilizer may be placed over the wrong crops, the vehicle may turn over, or the vehicle may crash into an object such as a building. Without precise operation, there is a risk of destruction of property, loss of time and injury.

To compensate for these and other drawbacks of automated vehicles, systems have been developed whereby a vehicle reverts to manual control upon detection of an emergency or alarm state. Systems may also slow the speed of the vehicle while reverting to manual control. Further, systems known in the art may passively or actively return the steering wheel to a center position upon release of automated control.

U.S. Pat. No. 6,067,782 discloses an automated steering system for machines. In this system, movement of the steering wheel beyond a threshold value deactivates the automatic steering mode and switches to manual steering mode. U.S. Pat. No. 6,198,992 discloses overriding a guidance control system to disengage automatic steering when movement of a steering wheel is sufficiently abrupt. U.S. Pat. No. 6,751,535 discloses controlling an unmanned vehicle utilizing GPS, where upon losing the road position data, the vehicle is slowed to a stop.

BRIEF SUMMARY OF THE INVENTION

The invention provides a partial manual control state for an automated vehicle including methods and apparatuses for maintaining the radius of curvature of a vehicle in an emergency condition.

An embodiment of the invention provides a method for control of a moving vehicle. In response to the detection of an alarm condition, a radius of curvature of the vehicle is maintained. Forward motion of the vehicle may also be maintained. The alarm condition may be detected based on various factors. The vehicle may be placed into a manual control state in response to operator control input. In one embodiment of the invention, the steering of the vehicle may be set to straight before the radius of curvature is maintained if it is determined that the radius of curvature is greater than a threshold.

Another embodiment of the invention comprises a vehicle having vehicle controls for controlling the vehicle, an automated navigation system for directing the vehicle controls, a manual control system for directing the vehicle controls, at least one sensor for detecting parameters of the vehicle, an override control unit for receiving data from the at least one sensor and directing the vehicle in a manner to maintain a radius of curvature in an alarm condition. The at least one sensor may obtain data from a navigational satellite. The override control unit may direct the vehicle controls to maintain forward motion of the vehicle when in the alarm condition. An operator control sensor may be used to detect operator control.

These and other advantages of the invention will be apparent to those of ordinary skill in the art by reference to the following detailed description and the accompanying drawings.

DETAILED DESCRIPTION

Figure 1:
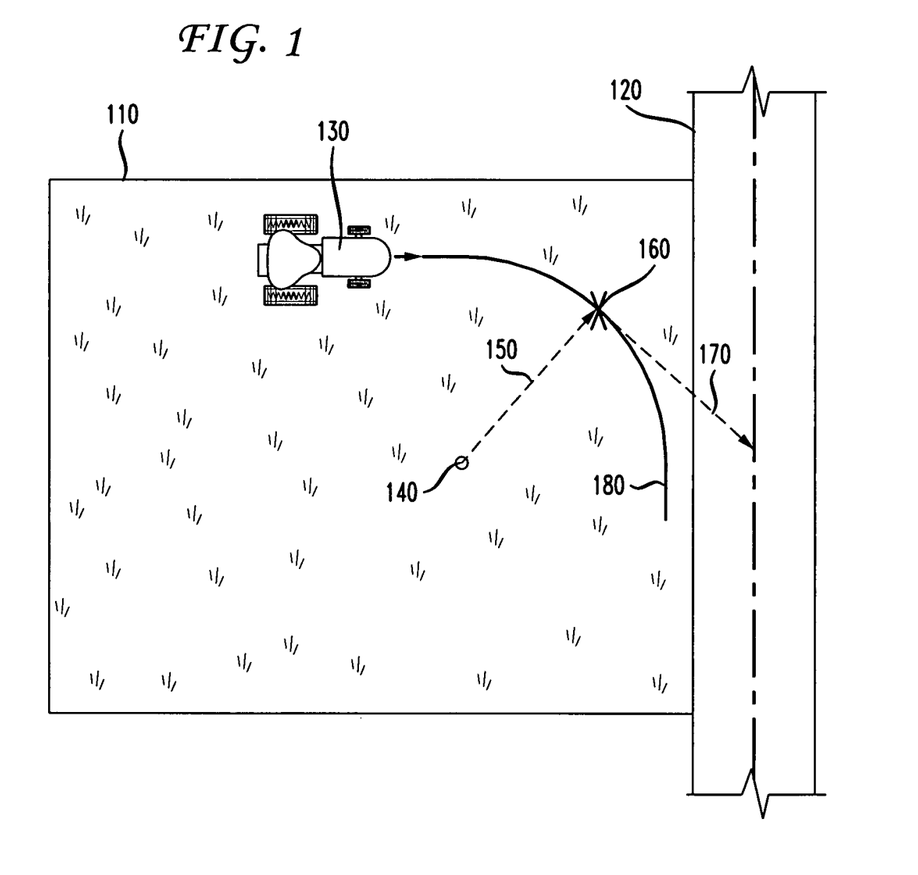
FIG. 1 shows an illustration of a vehicle path of an automated vehicle in the partial manual control state in accordance with embodiments of the invention.

FIG. 1 shows an illustration of a vehicle path of an automated vehicle in a partial manual control state in accordance with embodiments of the invention. In this illustration, control of a vehicle 130 is being directed by an automated navigation system. In this example, vehicle 130 is a tractor plowing a field 110. The field 110 is adjacent to a road 120. As the vehicle 130 travels towards a corner of the field 110, the automated navigation system turns the vehicle before the vehicle reaches the end of the field. In this illustration, the automated navigation system attempts to direct the vehicle to travel along curve 180. An alarm condition is detected at failure point 160 as a result of the automatic navigation system failing or the vehicle becoming unstable. Upon detection of an alarm condition, the prior art automated systems typically cause the vehicle to travel in straight path 170. However, as can be seen by FIG. 1, returning the vehicle 130 to straight path 170 upon detection of an alarm condition at point 160 is undesirable. The prior art method would result in vehicle 130 traveling onto road 120, creating a potentially dangerous situation for people and property.

The inventor has realized that in an alarm condition, it is desirable to have the vehicle continue traveling along the current path of travel, such as along path 180, by placing the vehicle in a partial manual control state. In the partial manual control state, the vehicle 130 continues to travel along the same path of travel, such as along path 180. When a user provides operator control input, such as a driver of the vehicle using the breaks, steering wheel, or the like, the vehicle enters full manual control.

Figure 2:
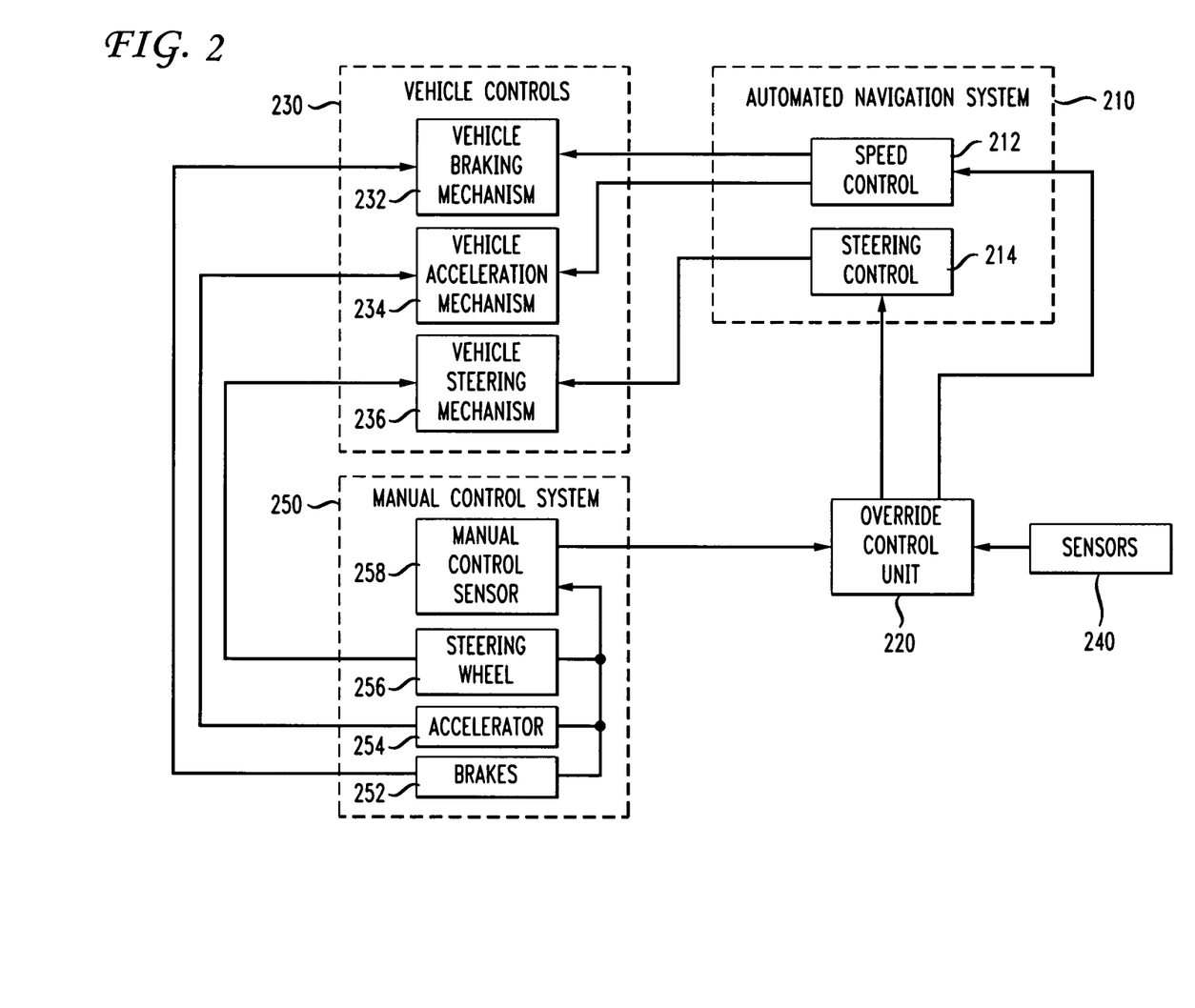
FIG. 2 shows a block diagram of a navigation control system in accordance with one embodiment of the invention.

FIG. 2 shows a block diagram of a vehicle navigation control system in accordance with an embodiment of the invention. An automated navigation system 210 is used to direct the operation of the vehicle. The automated navigation system 210 includes, but is not limited to, a speed control 212 and steering control 214 which direct the vehicle controls 230. More specifically, the speed control 212 directs a vehicle braking mechanism 232 and a vehicle acceleration mechanism 234. The steering control 214 directs a vehicle steering mechanism 236.

An override control unit 220 continuously or periodically reads data from sensors 240. The sensors 240 may include any sensing devices which sense parameters of the vehicle including sensors for measuring steering angle, traction, velocity, tilt, and physical location of the vehicle. Traction sensors are typically placed on the wheels. Gyroscopic sensors may aid in determining velocity and tilt of the vehicle. Physical location sensors may comprise one or a combination of sensors for obtaining data from and navigating based on navigational satellites, previously provided map data, previously provided path data, and other similar data. Sensors for monitoring the automated navigation system 210 and safe operation thereof may also be provided. It is also contemplated that other sensors 240 and sensing devices may be used with the invention. The sensors described herein above should be read as a subset of the sensors which are contemplated for use with the invention, but other sensors within the scope and spirit of the invention are also contemplated.

The override control unit 220 reads the data provided by the sensors 240 and detects an alarm condition. The override control unit 220 may be a separate override control device (as shown) or incorporated as an override control in the automated navigation system 210. An alarm condition is detected by the override control unit 220 when the sensors 240 indicate that the vehicle or the automated navigation system is malfunctioning or unstable. Instability of the automated navigation system 210 may include a condition whereby the sensors 240 or automated navigation system 210 are acting outside of prescribed parameters. Further, instability may be caused by the data provided by the one or more of the sensors 240 deviating from expected norms. For example, the vehicle may travel over thick mud and a sensor 240 may provide traction data to the override control unit 220 indicating that traction is at 50% of the optimal level. An alarm condition may be detected by the override control unit 220 as a result of this data. In another example, the traction may be at 75% of optimal level. However, a sensor 240 may provide velocity data to the override control unit 220 indicating that the velocity has increased 10 mph over the past 15 seconds. The override control unit 220 may be configured to take into account the combined changes of the data provided by the sensors 240 and detect an alarm condition. In yet another example, if the vehicle is being directed with the aid of satellite positioning data and new data indicates the vehicle is in a substantially different location than previous data indicated, an alarm may be detected because the true position of the vehicle is unknown, and thus, the proper path to guide the vehicle cannot be determined. This may occur due to malfunction of the receiver, satellite clock errors, multipath distortion, and other factors which result in an incorrect position reading.

When an alarm condition is detected, the vehicle enters a partial manual control state where the current radius of curvature is maintained. Other vehicle controls may be under automatic or manual control in the partial manual control state or in a transition state whereby automatic control is slowly disengaged and manual control is returned. For example, in one embodiment of the partial manual control state, forward motion of the vehicle may be maintained. This may be desired so that other vehicles traveling nearby have time to adjust and avoid a collision with the vehicle in the alarm condition or to allow a safe transition of the vehicle from automated to manual control. In one embodiment, the speed of the vehicle may be slowed at a controlled rate. In another embodiment, the speed may be maintained at the present rate. In another embodiment of the partial manual control state, no control of the vehicle speed may occur, allowing the vehicle to decelerate (or accelerate) without any automated control.

Referring again to FIG. 1, depicting an embodiment of the invention, the concept of maintaining the radius of curvature may be more clearly understood. At failure point 160, an alarm condition is detected and the vehicle is placed into a partial manual control state as described herein above. In the example shown in FIG. 1, at the time of the alarm condition, the vehicle 130 is in a turning condition such that the vehicle follows the path of curve 180. In the partial manual control state, the vehicle 130 continues to travel in the path of curve 180 after the alarm condition is detected at failure point 160. The eventual path that the vehicle will travel when forward motion is maintained will be a complete circle having a center point 140 and a radius 150. Center point 140 is the point equidistant from all points on the circular path of travel of vehicle 130. Radius 150 is the distance from the center point 140 to the circular path of travel of vehicle 130. The radius 150 is defined herein as the radius of curvature. As wheel angle increases, the radius of curvature decreases. Inversely, as wheel angle decreases, the radius of curvature increases. Wheel angle is a measure of the angle between a present wheel position and the position of the wheel when the wheel is aligned with the forward path of travel of the vehicle. It should be understood that real world conditions may vary from the idealistic conditions explained herein above. It should also be understood that the vehicle need not travel through an entire circle, but rather the radius of curvature can be calculated based upon consideration of the path of travel of the vehicle, wheel angle of the vehicle, and other indicators.

In another embodiment of the invention, the radius of curvature at the time the alarm condition is detected is maintained only if the radius of curvature is below a threshold. This is because when the vehicle is traveling in a near-straight path, it may be deemed to be safer to have the vehicle travel straight. For example, a vehicle having a large radius of curvature at the time an alarm condition is detected may be making a momentary adjustment to an otherwise straight path of travel. In such instances, having a straight path of travel is more desirable. Typically, when the radius of curvature of the vehicle is less than a threshold radius of approximately 20 meters, it is desired to maintain the radius of curvature, although any reasonable radius of curvature can be used as the threshold and depends on the application and desire of the manufacturer, owner, or operator of the vehicle.

Referring again to FIG. 2, maintaining the radius of curvature may be accomplished in a variety of ways. The override control unit 220 may determine the radius of curvature at the time the alarm condition is detected based on data provided by sensors 240. The override control unit 220 or automated navigation system 210 may use this data to calculate the radius of curvature and control the vehicle via steering control 214 and the vehicle steering mechanism 236. In the event that this is not possible, such as the alarm condition being detected due to corrupt or conflicting data from a sensor or sensors 240, reliable data from some point in time before the detection of the alarm condition may be used to set the steering and radius of curvature. On the other hand, the radius of curvature may be adjusted periodically or constantly during the alarm condition if the data provided by sensors 240 is reliable to calculate the radius of curvature. Backup sensors in a backup or other system may be provided and may be necessary to ensure safety. Still further, the vehicle steering mechanism 236 may be held in place when the alarm condition is detected.

Depending on the cause of the alarm, various means and apparatuses for maintaining the radius of curvature may be employed. A combination of the means and apparatuses may be employed. For example, if the override control unit 220 is configured to detect an alarm condition as soon as there is a loss of a reliable GPS signal, it may be desired to maintain the present radius of curvature, as this will be fairly accurate. If the alarm condition is detected because of malfunction of a sensor, present data will be unavailable. As such, it may be desired to use the data from some point in time before the alarm condition was detected. In another example, where the sensors 240 are providing corrupt data due to malfunction of the sensors, it may be desired to hold the vehicle steering mechanism 236 in place as an immediate means to maintain the radius of curvature.

When the alarm condition is detected, a user may be notified by means such as an audible, visual, or tactile notification. A radio signal is also contemplated whereby information about the alarm condition is transmitted to a base station or other central location.

When manual control input is detected from a manual control system 250, the vehicle is placed into a full manual control state. The manual control system 250 comprises various mechanisms to direct the vehicle controls manually. Typical manual controls include operator control input such as brakes 252, an accelerator 254, and a steering wheel 256 which may be utilized by the user to direct the vehicle braking mechanism 232, vehicle acceleration mechanism 234, and vehicle steering mechanism 236. Additional manual controls which may be included and are not depicted in the figures may include but are not limited to emergency breaks, gear shifters, etc.

While in the partial manual control state, the system maintains the current radius of curvature such that the vehicle substantially travels in a circular path. During the partial manual control state, it may also be desired for the override control unit 220 to direct the speed control 212, vehicle braking mechanism 232, or a backup braking system (not depicted) to slow or stop the vehicle. By slowing or stopping the vehicle, an additional measure of safety is provided. When a user takes manual control of the vehicle, all automated guidance and navigation systems are disengaged.

Operator control input is detected by a manual control sensor 258 in the manual control system 250. The manual control sensor 258 provides data to the override control unit 220 indicating that a user has taken control of the vehicle based on usage of at least one manual control apparatus of the manual control system 250. For example, when the steering wheel 256 is touched or moved a significant amount, the accelerator 254 is depressed by the user, or the brakes 252 are depressed by the user, a manual control sensor 258 detects this movement. When operator control is detected, the manual control sensor 258 sends a signal to the override control unit 220 indicating that such operator control has occurred.

Other operator control sensors and indicators may be used to detect indications of operator control input or impending operator control and signal the override control unit 220 that an operator is controlling the vehicle. Such indications may include detection of a user sitting in a previously empty driver's seat, changing gear, pushing a manual control button/lever, operating a control on the dashboard of the vehicle, and so on. It is also contemplated that an operator control sensor would detect remote control, for example, by a radio signal. Upon remote control of the vehicle, the override control unit 220 would be sent data to pass control of the vehicle over to a remote control system.

Figure 3:
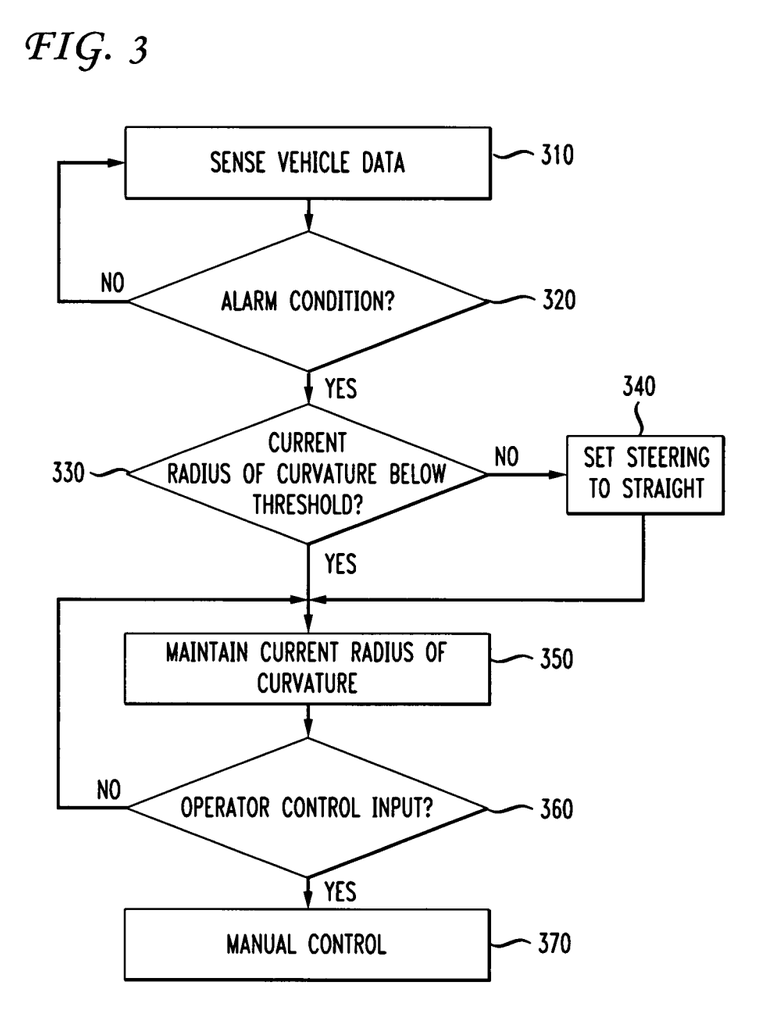
FIG. 3 shows the steps performed by the navigation control system in accordance with one embodiment of the invention.

Referring now to FIG. 3, the figure shows the steps performed by the navigation control system of an embodiment of the invention. In step 310, vehicle data is sensed. This vehicle data may include but is not limited to data regarding vehicle speed, location, heading, traction of individual wheels or the vehicle as a whole, braking power, and so on. Navigational satellite receivers such as GPS receivers may be used to aid in location, heading, speed, and other data.

In step 320, it is determined whether an alarm condition has been detected. An alarm condition is detected based up sensed vehicle data and determined based on the criteria described hereinabove. If no alarm condition is detected, step 310 and step 320 repeat until an alarm condition is detected.

Once an alarm condition is detected in step 320, in step 330 it is determined whether the current radius of curvature of the automated vehicle is below a threshold. The threshold may be any value appropriate for the particular implementation. As explained herein above, as wheel angles increase, the radius of curvature decreases under most conditions. Inversely, as wheel angles decrease, the radius of curvature increases under most conditions. As wheel angle decreases towards zero, the vehicle approaches a straight path. When the vehicle has a radius of curvature above a threshold value and an alarm condition is detected, it is desired to have the vehicle travel in the straight path and so the steering is set to straight in step 340. Traveling in a straight path under such conditions may be desirable because a large radius of curvature may indicate a small adjustment to an otherwise straight path of travel that should not be maintained. Steering may also be set to straight when the wheel angle of a designated wheel is below a threshold. If it is determined in step 330 that the radius of curvature is below the threshold value, then step 350 is performed without performing step 340.

The current radius of curvature is maintained in step 350. If the steering was set to straight in step 340, this will result in maintaining a straight path of travel. If step 340 was not performed depending on the results of step 330, then the current radius of curvature is the radius of curvature at the time the alarm condition was detected or at a time shortly before the alarm condition was detected. Maintaining the current radius of curvature may be accomplished by holding a steering mechanism in place or by using an automated navigation system. The radius of curvature may also be set based on the sensed vehicle data at the time of the alarm condition. If such data is not useful, such as when the alarm condition was detected due to an unexpected abrupt turn, or the data is corrupted or otherwise cannot be safely used, it will be necessary to use data obtained from a time before the alarm condition was detected. In an embodiment of the invention, backup sensors are used to provide data regarding the radius of curvature so that the radius of curvature may be properly maintained.

In step 360, it is determined whether operator control has been detected. If operator control has not been detected, steps 350 and 360 are repeated whereby the current radius of curvature is maintained until there is operator control input. As explained similarly above with reference to FIG. 2, operator control input may include but is not limited to a user steering, braking, accelerating, changing gears, sitting in the driver's seat, using a manual control button or lever, and so on. It is also contemplated that control input be in the form of a radio signal indicating that control is occurring via remote operation. If, in step 360, operator control is detected, the vehicle is placed into manual control in step 370.

Figure 4:
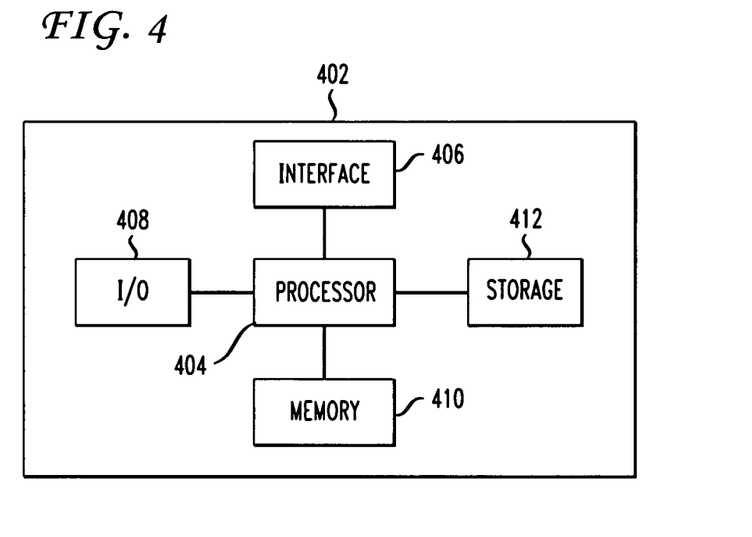
FIG. 4 shows a high level block diagram of an override control unit in which the invention can be implemented.

FIG. 4 shows a high level block diagram of an override control unit in which the invention can be implemented. One skilled in the art will recognize that FIG. 4 shows a high level functional block diagram wherein the automated navigation system 210, override control unit 220, and manual control system 250 may be implemented using an appropriately programmed general purpose computer or other similar circuitry. One or more of the apparatuses may be implemented in a single general purpose computer. The functions and steps disclosed herein may be implemented by computer devices for performing control operations of a vehicle. Such devices may be implemented, for example, using well known computer processors, memory units, storage devices, computer software, network interfaces and other components. For example, a high level block diagram of such a computer is shown in FIG. 4. Computer 402 contains a processor 404 which controls the overall operation of computer 402 by executing computer program instructions which define such operation. The computer program instructions may be stored in a storage device 412 (e.g., flash ram) and loaded into memory 410 when execution of the computer program instructions is desired. Thus, an apparatus may be defined by computer program instructions stored in memory 410 and/or storage 412 and the apparatus will be controlled by processor 404 executing the computer program instructions. Computer 402 also includes one or more interfaces 406 for communicating with other devices via a network. Computer 402 also includes input/output 408 which represent devices which allow for user interaction with the computer 402 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes.

One having ordinary skill in the art would be able to understand and practice and adapt this invention to conditions with hills, valleys, gravity, and curvature of the earth. In an embodiment of the invention, the radius of curvature of the vehicle is maintained notwithstanding these features. It is also contemplated to practice this invention with a partial manual control state of flying and submerged craft.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for control of a moving vehicle comprising:
   detecting an alarm condition, said step of detecting an alarm condition comprising detecting that said vehicle has become unstable;
   determining, by a controller, a radius of a curved path that said vehicle is following at the time when said alarm condition is detected; and
   in response to said alarm condition, maintaining the curved path based at least in part on data received via one or more GPS receivers.

2. The method of claim 1 wherein said step of maintaining the curved path comprises maintaining forward motion of said vehicle.

3. The method of claim 1 further comprising:
   placing said vehicle in a manual control state in response to an operator control input.

4. The method of claim 1 wherein said radius is determined based on data from at least one sensor.

5. The method of claim 1, further comprising:
   receiving a GPS signal via one or more GPS receivers; and
   detecting an alarm condition when a loss of the GPS signal occurs.

6. A method for control of a moving vehicle comprising:
   detecting an alarm condition, said step of detecting an alarm condition comprising detecting that said vehicle has become unstable; and
   determining, by a controller, a radius of curvature of said vehicle when said alarm condition was detected;
   in response to said alarm condition, maintaining said radius of curvature based at least in part on data received via one or more GPS receivers.

7. The method of claim 6 wherein said step of maintaining said radius of curvature comprises maintaining forward motion of said vehicle.

8. The method of claim 6 further comprising:
   placing said vehicle in a manual control state in response to an operator control input.

9. The method of claim 6 further comprising:
   setting steering of said vehicle to straight before said maintaining said radius of curvature if said determined radius of curvature is greater than a threshold.

10. A vehicle comprising:
    vehicle controls for controlling said vehicle;
    an automated navigation system for directing said vehicle controls;
    a manual control system for directing said vehicle controls;
    at least one sensor for detecting at least one parameter of said vehicle;
    one or more GPS receivers; and
    an override control unit for:
       receiving data from said at least one sensor;
       determining a radius of a curved path that said vehicle is following when an alarm condition is detected; and
       directing said vehicle controls to maintain the curved path based at least in part on data received via the one or more GPS receivers;
    wherein said alarm condition is a result of vehicle instability.

11. The system of claim 10, wherein said alarm condition is a result of a malfunction of said at least one sensor.

12. The system of claim 10, further comprising an operator control sensor for detecting operator control.

13. The system of claim 10, wherein said override control unit further directs said vehicle controls to maintain forward motion of said vehicle.

14. An apparatus for control of a moving vehicle comprising:
   means for detecting an alarm condition, said means for detecting an alarm condition further comprising means for detecting vehicle instability;
   means for determining a radius of a curved path that said vehicle is following at the time when said alarm condition is detected; and
   means for maintaining the curved path based at least in part on data received via one or more GPS receivers, in response to said alarm condition.

15. The apparatus claim 14 wherein said means for maintaining the curved path comprises means for maintaining forward motion of said vehicle.

16. The apparatus of claim 14 further comprising:
   means for placing said vehicle in a manual control state in response to an operator control input.

17. The apparatus of claim 14 further comprising:
   means for steering of said vehicle straight before said maintaining the curved path if said determined radius is greater than a threshold.

* * * * *